(12) United States Patent
Shanmuganathan et al.

(10) Patent No.: US 11,034,829 B2
(45) Date of Patent: Jun. 15, 2021

(54) ORGANIC FLEXIBLE FERROELECTRIC POLYMER NANOCOMPOSITES

(71) Applicant: Council of Scientific & Industrial Research, New Delhi (IN)

(72) Inventors: Kadhiravan Shanmuganathan, Pune (IN); Ram Farsa, Pune (IN)

(73) Assignee: COUNCIL OF SCIENTIFIC & INDUSTRIAL RESEARCH, New Delhi (IN)

( * ) Notice: Subject to any disclaimer, the term of this patent is extended or adjusted under 35 U.S.C. 154(b) by 0 days.

(21) Appl. No.: 16/609,127

(22) PCT Filed: May 1, 2018

(86) PCT No.: PCT/IN2018/050271
§ 371 (c)(1),
(2) Date: Oct. 28, 2019

(87) PCT Pub. No.: WO2018/198139
PCT Pub. Date: Nov. 1, 2018

(65) Prior Publication Data
US 2020/0199341 A1    Jun. 25, 2020

(30) Foreign Application Priority Data
Apr. 28, 2017  (IN) .............................. 201711015094

(51) Int. Cl.
C08L 27/16  (2006.01)
C08J 5/04  (2006.01)
C08L 27/20  (2006.01)

(52) U.S. Cl.
CPC ............... *C08L 27/16* (2013.01); *C08J 5/045* (2013.01); *C08L 27/20* (2013.01); *C08J 2327/16* (2013.01);
(Continued)

(58) Field of Classification Search
CPC .. C08L 1/08; C08L 27/16; C08L 27/20; C08J 2401/08; C08J 2327/16; C08J 2327/20
See application file for complete search history.

(56) References Cited

U.S. PATENT DOCUMENTS 6,878,440 B1    4/2005  Yamanaka et al.
2010/0314587 A1  12/2010  Carroll et al.

FOREIGN PATENT DOCUMENTS

CN        106380756 A  *  2/2017
WO    WO 2006/121294       11/2006
WO    WO2006/121294 A1    11/2006

OTHER PUBLICATIONS

English-language machine translation of CN-106380756-A, performed on Espacenet on Nov. 17, 2020.*
(Continued)

*Primary Examiner* — Nicholas E Hill
(74) *Attorney, Agent, or Firm* — Belles Katz LLC

(57) ABSTRACT

The present invention discloses organic flexible ferroelectric polymer nanocomposites. The present invention discloses a composite of fluorinated polymers or their copolymers with halogenated cellulosic materials and a facile process for the conversion of non-electroactive alpha phase of fluorinated polymer to electroactive beta phase of fluorinated polymer. Further, it discloses a device comprising the composite with enhanced dielectric properties.

9 Claims, 15 Drawing Sheets

(52) U.S. Cl.
CPC ........ *C08J 2327/20* (2013.01); *C08J 2401/08* (2013.01); *C08L 2203/20* (2013.01)

(56) References Cited

OTHER PUBLICATIONS

International Search Report and Written Opinion from PCT/IN2018/050271, dated Aug. 8, 2018, pp. 1-10.
Fashandi et al., "Morphological changes towards enhancing piezoelectric properties of PVDF electrical generators using cellulose nanocrystals," Cellulose 23(6):3625-3637, Sep. 15, 2016.
Fu et al., "Improved piezoelectric properties of electrospun poly(vinylidene fluoride) fibers blended with cellulose nanocrystals," Materials Letters 187:86-88, Oct. 17, 2016.
International Search Report and Written Opinion for International Application No. PCT/IN2018/050271 dated Aug. 8, 2018.
Rajesh et al., "Enhancing beta-phase in PVDF through physicochemical modification of cellulose," Electronic Materials Letters 10(1):315-319, Jan. 10, 2014.
Sampada et al., "Beta-phase enhancement in polyvinylidene fluoride through filler addition: comparing cellulose with carbon nanotubes and clay," Journal of Polymer Research 21(5):434, Apr. 16, 2014.

\* cited by examiner

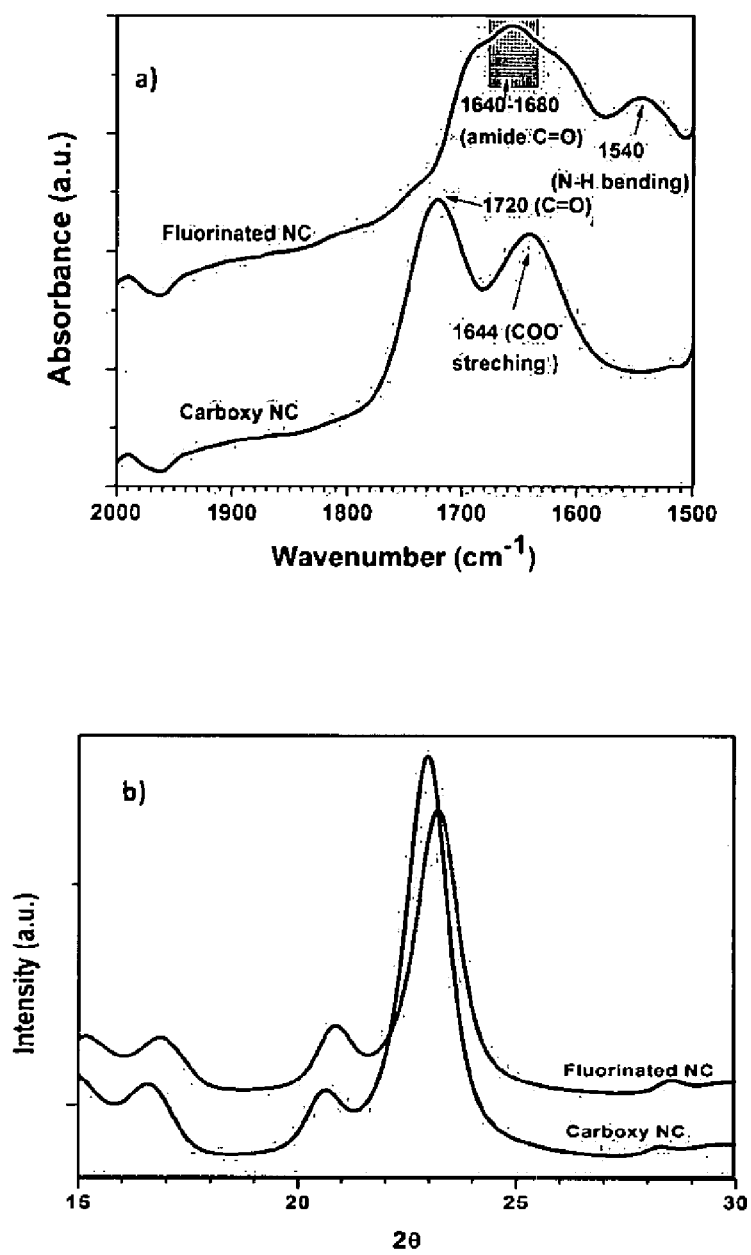
Figure: 1

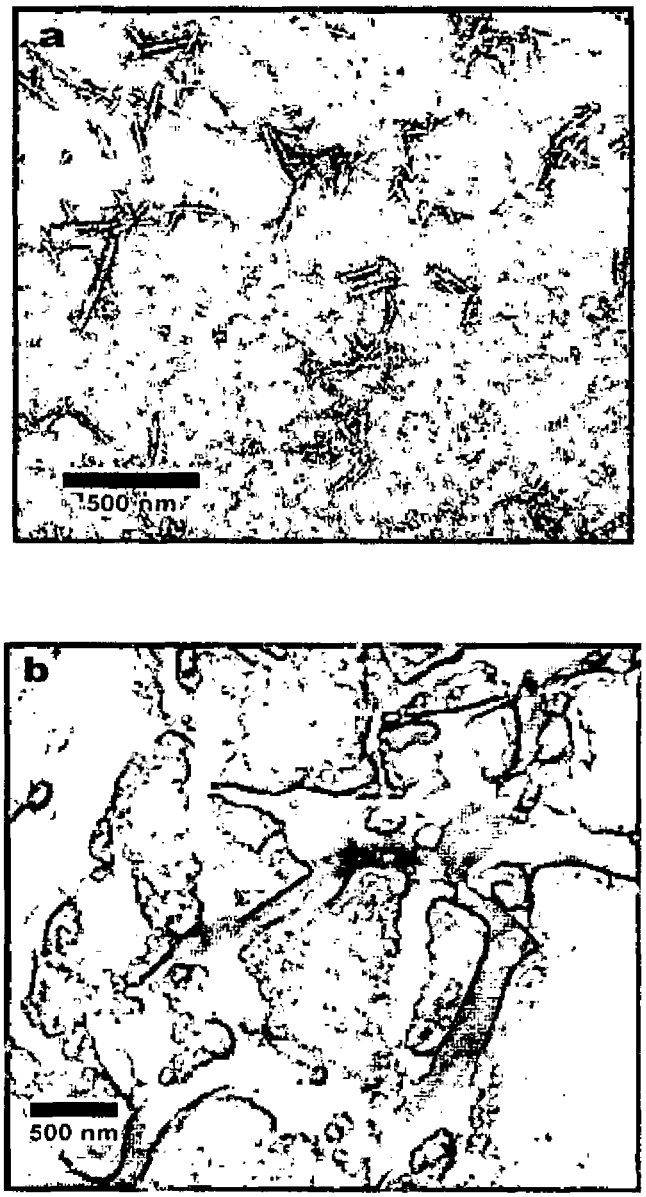
Figure: 2

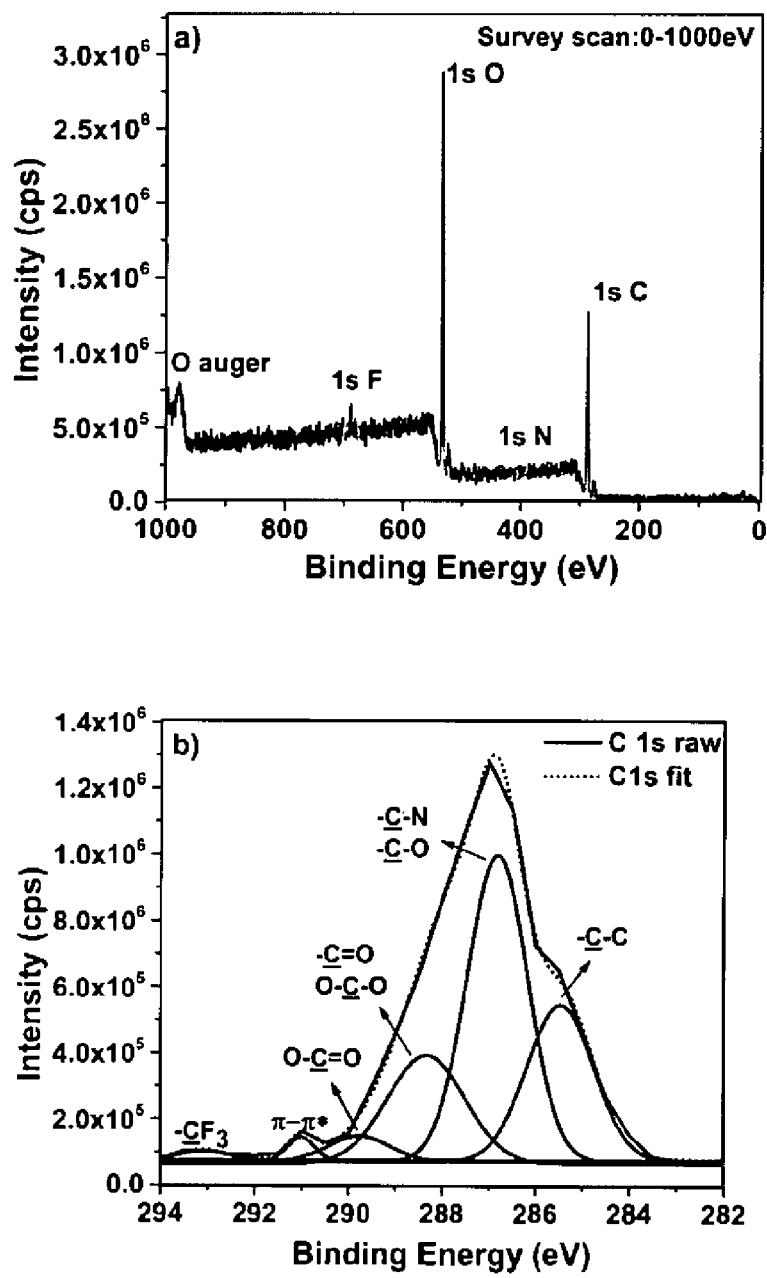
Figure: 3

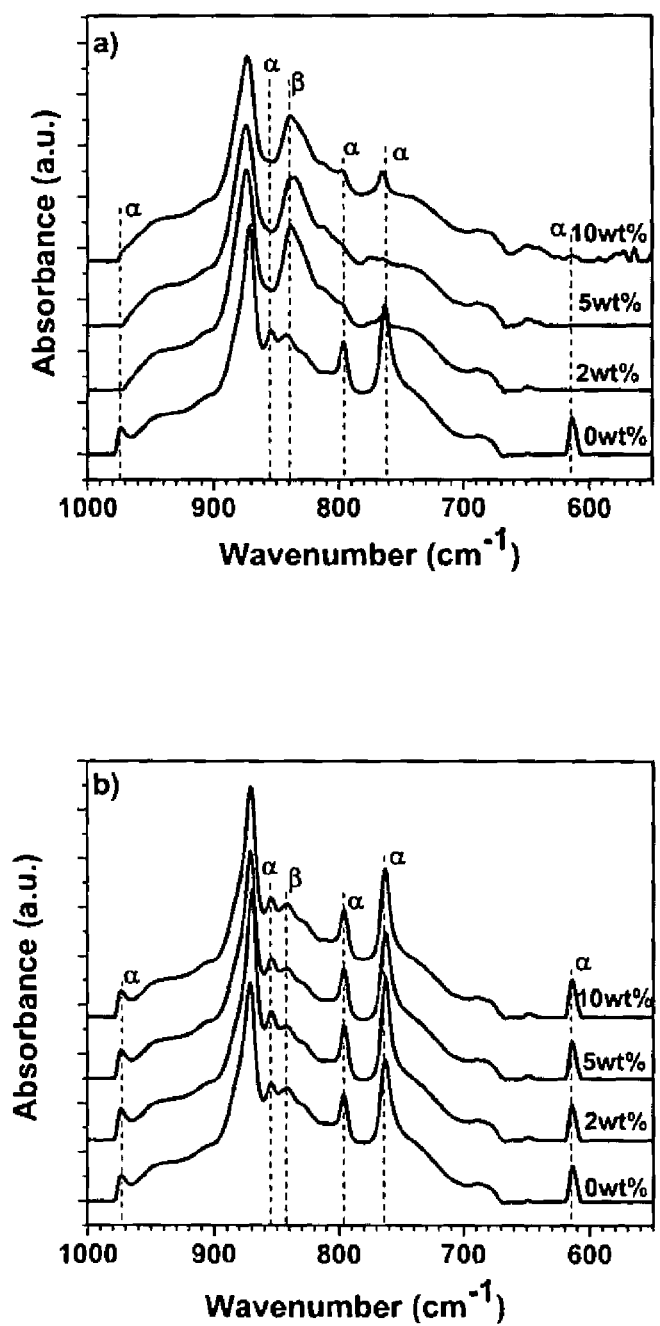
Figure: 4

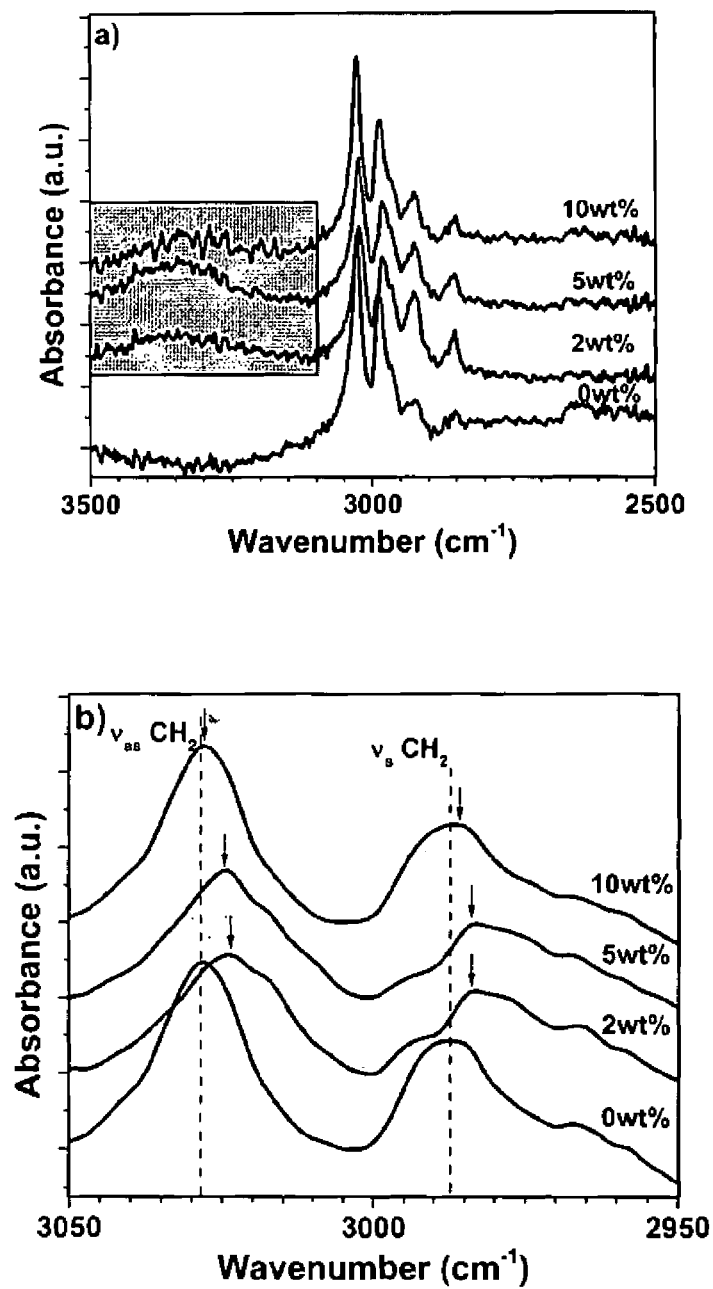
Figure: 5

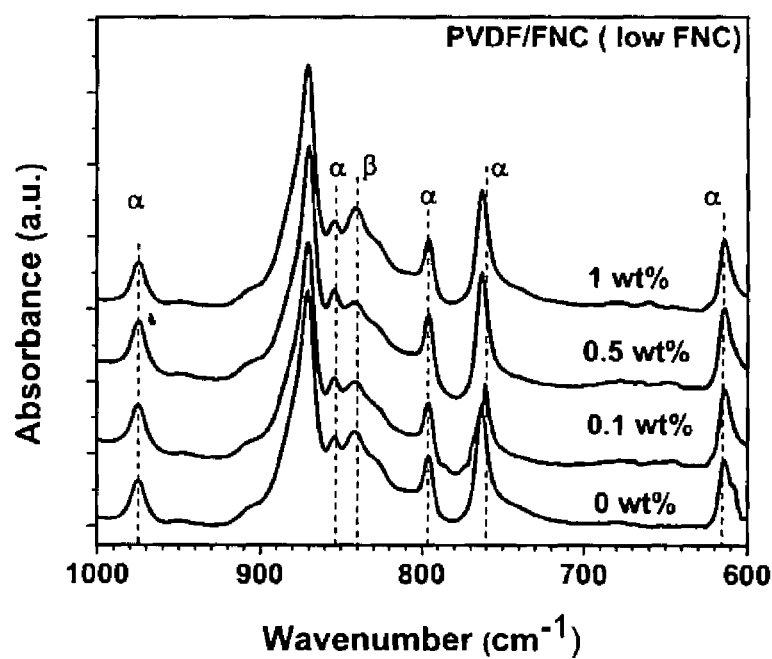
Figure: 6

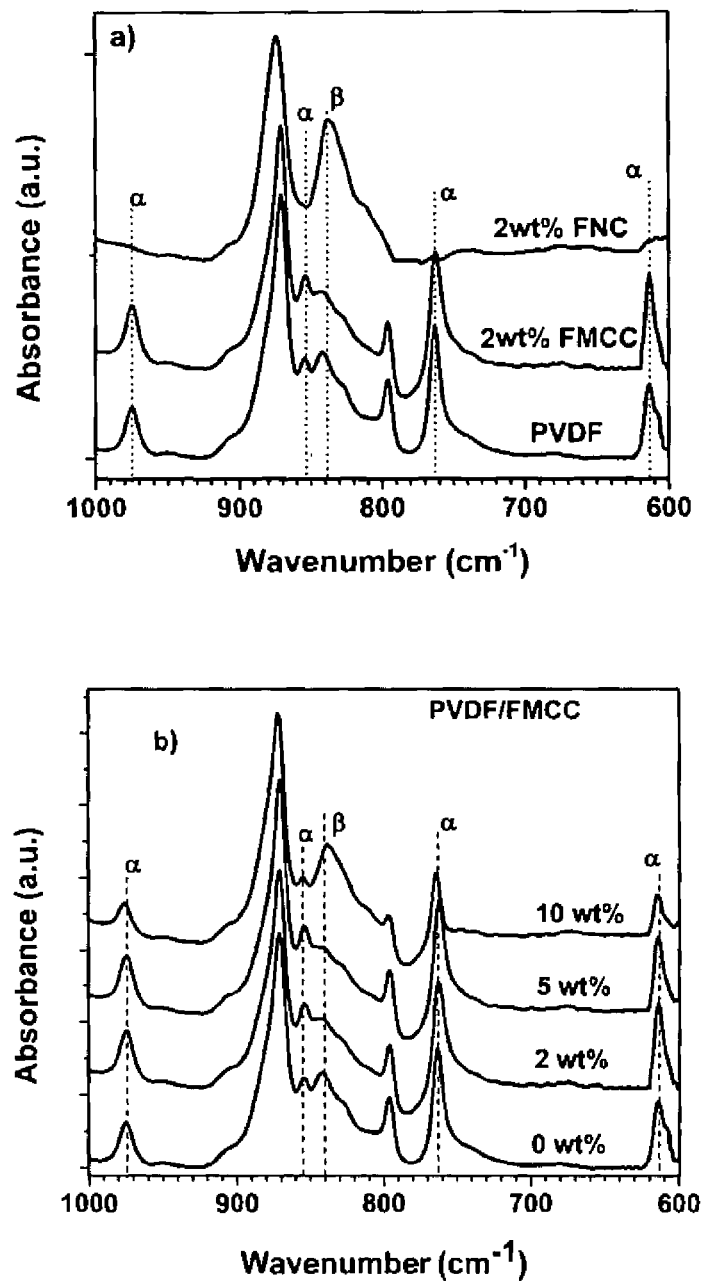
Figure: 7

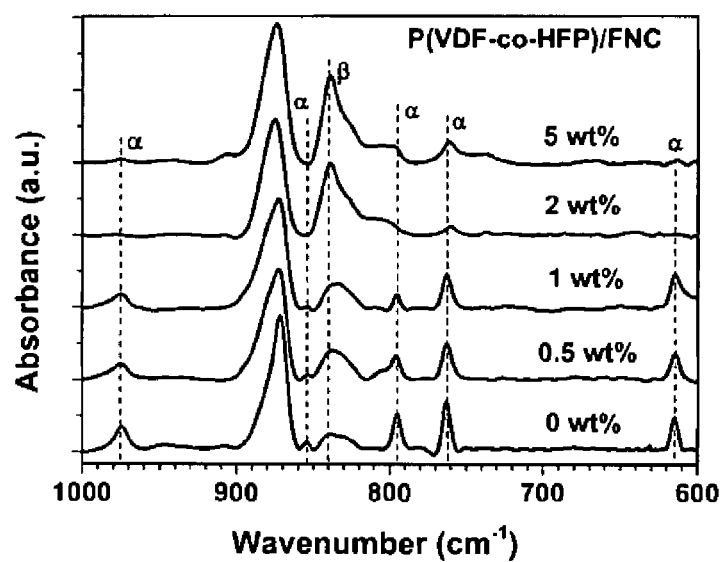
Figure: 8

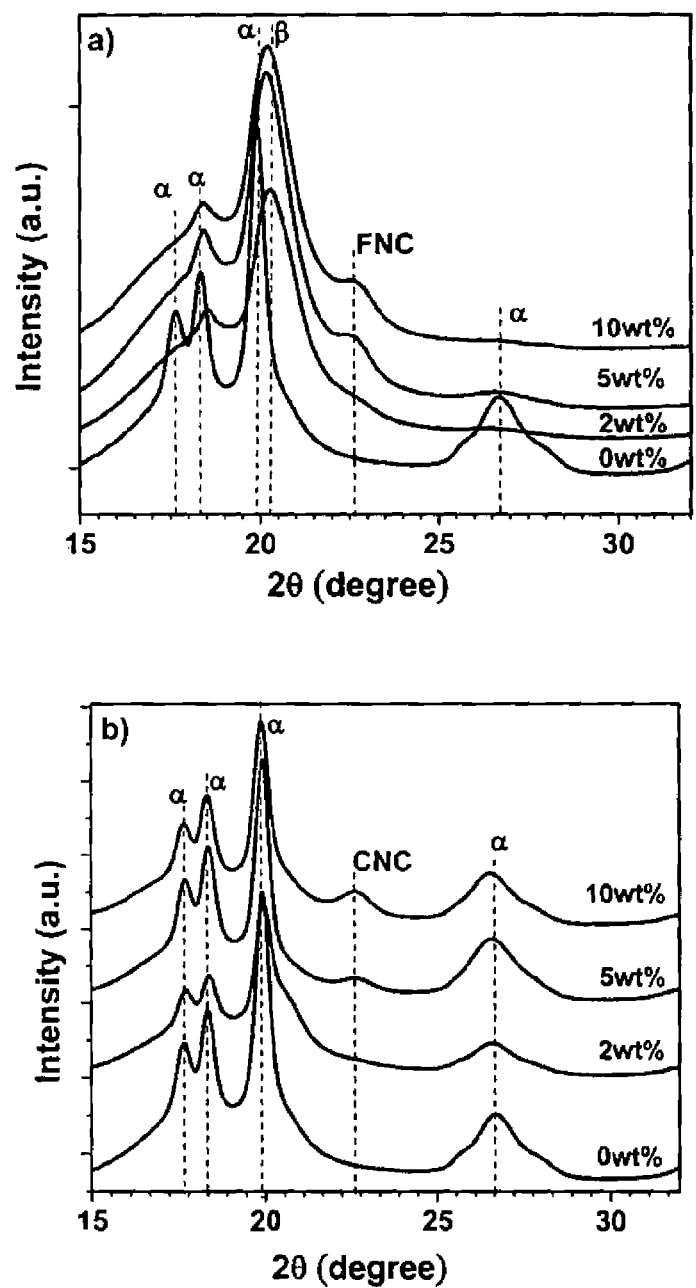
Figure: 9

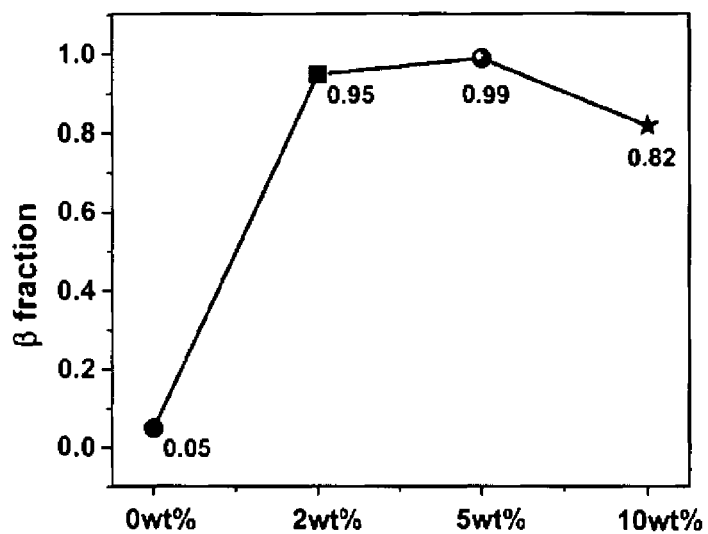
Figure: 10
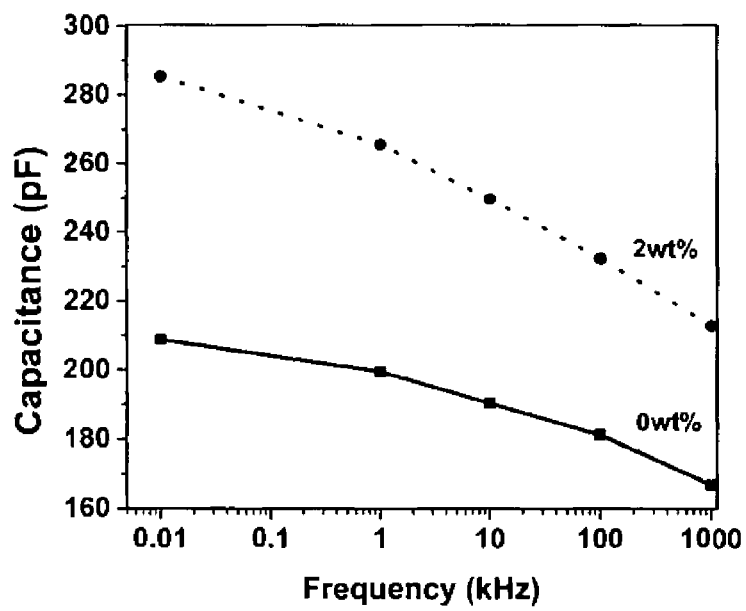
Figure: 11

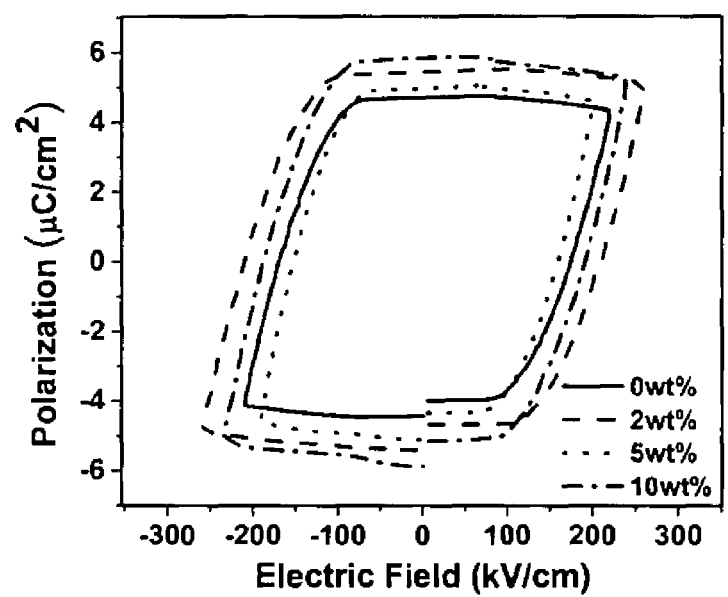
Figure: 12

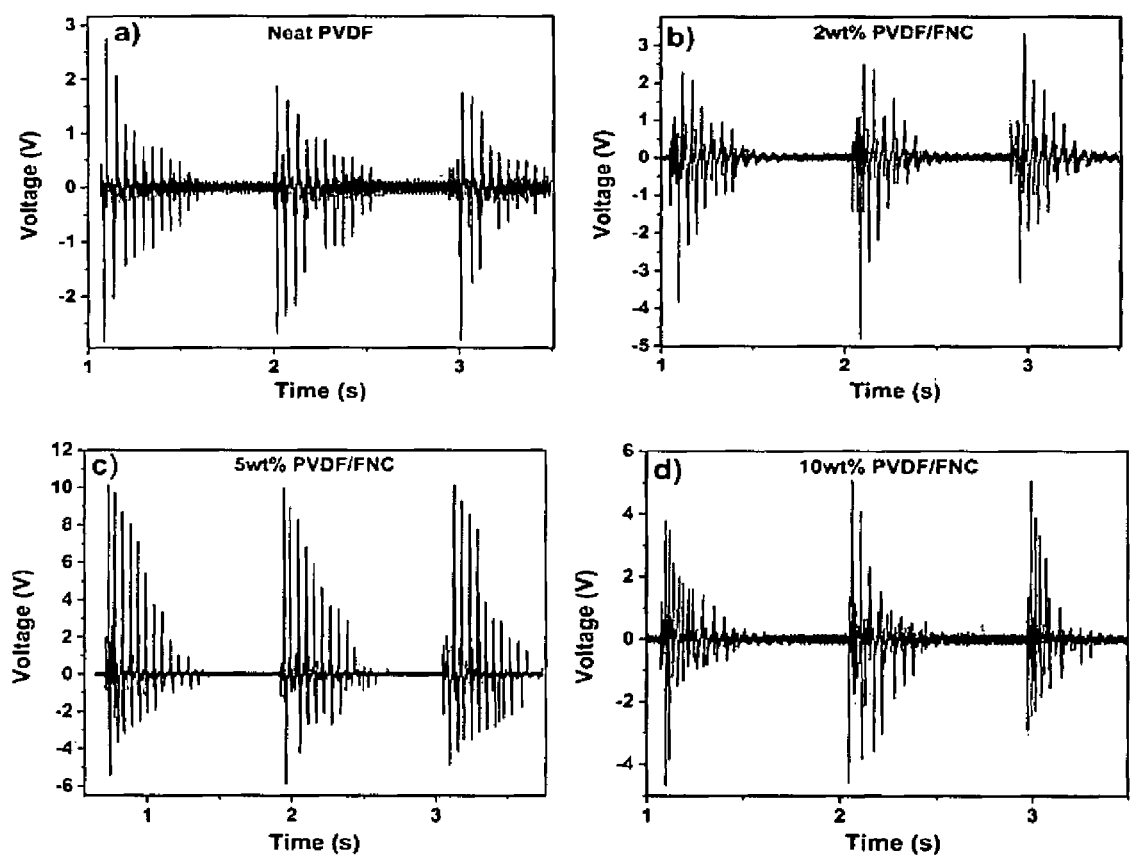
Figure: 13

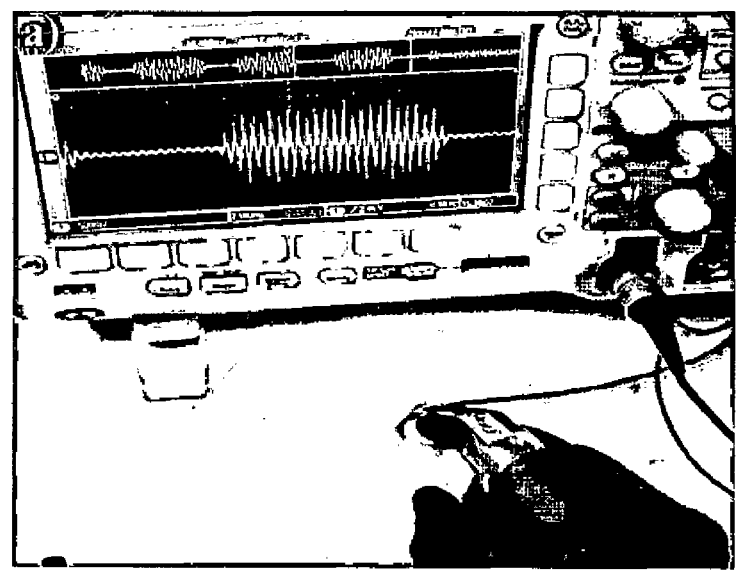
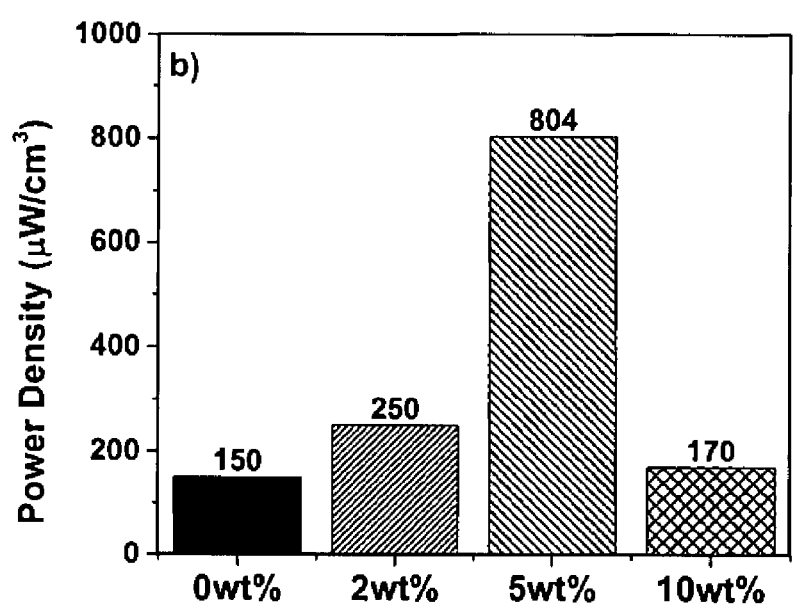
Figure: 14

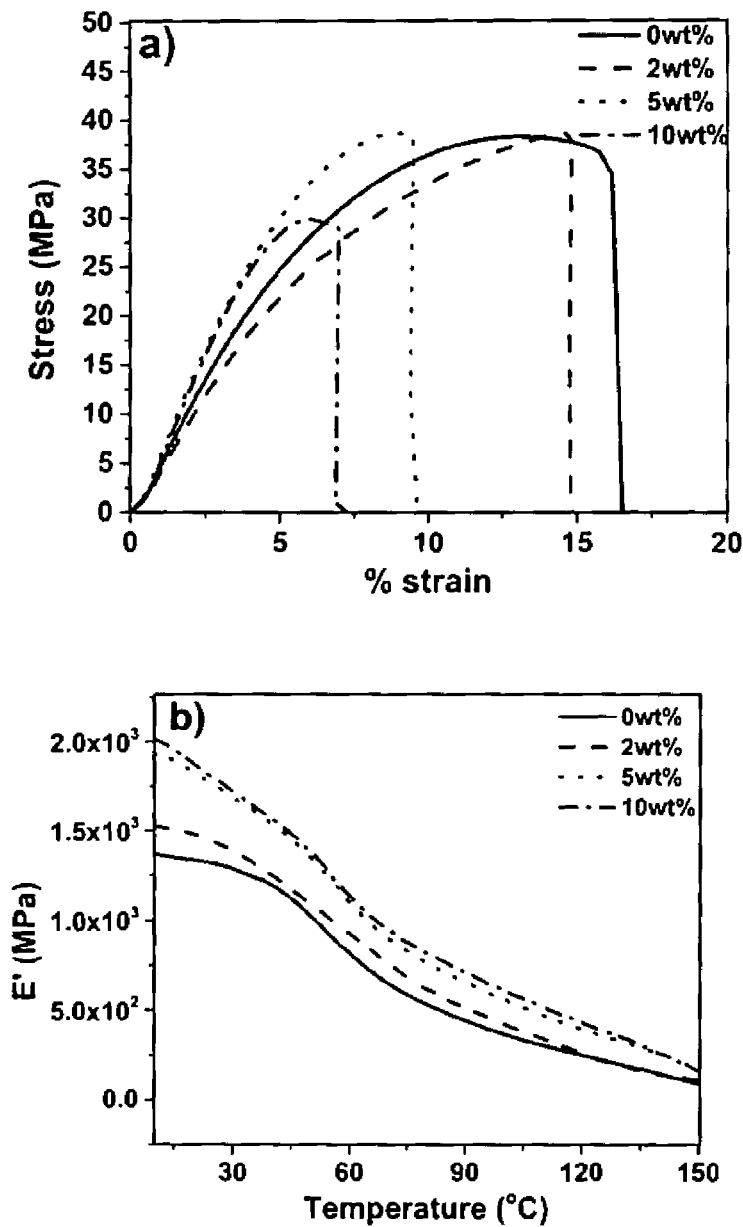
Figure: 15

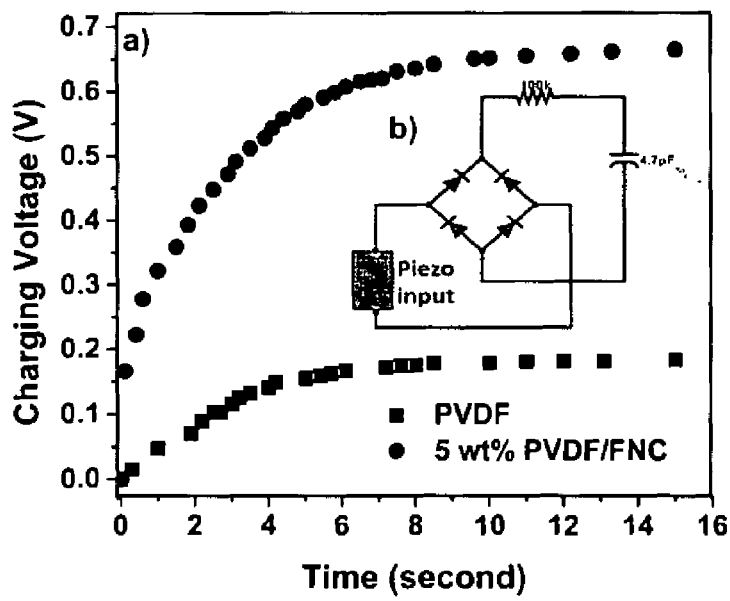
Figure: 16
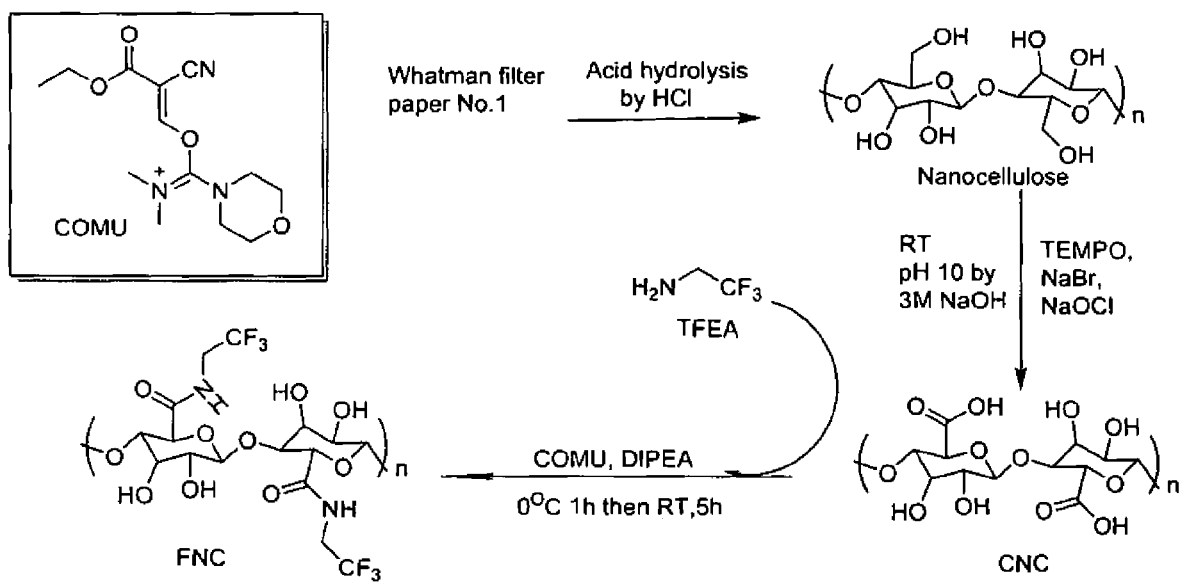
Figure 17

ORGANIC FLEXIBLE FERROELECTRIC POLYMER NANOCOMPOSITES

CROSS-REFERENCE TO RELATED PATENT APPLICATIONS

The present application is a U.S. national stage application under 35 U.S.C. § 371 of PCT Application No. PCT/IN2018/050271, filed May 1, 2018, which claims priority to Indian Application No. 201711015094, filed Apr. 28, 2017, the entireties of which are incorporated herein by reference.

FIELD OF THE INVENTION

The present invention relates to organic flexible ferroelectric polymer nanocomposites. Particularly, the present invention relates to a composite of fluorinated polymers or their copolymers with halogenated cellulosic materials and a facile process for the conversion of non-electroactive alpha phase of fluorinated polymer to electroactive beta phase of fluorinated polymer. More particularly, present invention relates to a device comprising the composite with enhanced dielectric properties.

BACKGROUND AND PRIOR ART OF THE INVENTION

Piezoelectric materials refer to a broad category of materials that exhibit a change in electrical polarization in response to mechanical stress (direct effect) or that exhibit mechanical deformation in response to applied electrical charge or signal (converse effect). In the late 1960's, piezoelectric behavior of poly (vinylidene fluoride) (PVDF) was first documented and since then organic ferroelectric materials have gained increasing attention. Inorganic ferroelectric materials have a much higher piezoelectric strain constant ($d_{31}$=175 pC/N) than PVDF ($d_{31}$=28 pC/N), and have been the material of choice for energy harvesting applications. Nonetheless, polymer-based ferroelectric materials have many advantages such as light weight and flexibility; lower elastic stiffness, good processability, higher strain to fail, high strength and impact resistance etc. Moreover, acoustic impedance of PVDF is much lower than ceramics making them highly desirable for medical and underwater applications. PVDF and its copolymers have garnered the most attention among all these polymers due to their highly compact structure and large permanent dipole moment which results in strong piezoelectric behavior. PVDF exhibits many crystal phases such as α, β, γ, and δ. US20100314587 A1 discloses compositions prepared by combining nanomaterials with a halide-containing polymer, thereby forming a combined polymer matrix having dispersed nanomaterials within the matrix. The nanomaterials may be carbon-based nanotubes, in some applications. A halide-containing monomer is combined with nanotubes, and then polymerized in some compositions. In other applications, a halide-containing polymer is solution processed with nanotubes to form useful compositions in the invention. Also disclosed are probes for near field detection of radiation.

U.S. Pat. No. 6,878,440 discloses a fluorine-containing material substrate having coated thereon a pressure sensitive adhesive is irradiated with an electron beam, forming a chemical bond between substrate and the pressure sensitive adhesive. Furthermore the pressure sensitive adhesive can be cured by polymerization and also the substrate can be crosslinked.

State of the art approach to enhance dielectric and ferroelectric properties of PVDF include adding high volume fractions of inorganic nanomaterials such as barium titanate, titanium particles or gold nanorods. However these composites show dielectric permittivity values around 18-20 at 1 kHz. The large electrical mismatch between ferroelectric polymers and these high-k inorganic nanomaterials typically leads to a highly distorted electric field and the high volume fraction of additives significantly reduces the effective breakdown strength of the nanocomposites.

Therefore, it is the need to develop all-organic ferroelectric nanocomposites having better processability, flexibility and enhanced efficiency.

OBJECTIVE OF THE INVENTION

Main objective of the present invention is to provide organic flexible ferroelectric polymer nanocomposites.

Another objective of the present invention is to provide a composite of fluorinated polymers or their copolymers with halogenated cellulosic materials with enhanced dielectric and ferroelectric properties.

Still another objective of the present invention is to provide a composite of fluorinated polymers or their copolymers for the conversion of non-electroactive alpha phase to electroactive beta phase of fluorinated polymer or their copolymer.

Yet another objective of the present invention is to provide film of the composite of fluorinated polymers or their copolymers with halogenated cellulosic materials wherein the film shows enhancement of conversion of α phase to β phase of the fluorinated polymer and its copolymer.

Still yet another objective of the present invention is to provide a device comprising the composite with enhanced dielectric properties and ferroelectric properties.

Still yet another objective of the present invention is to provide a device comprising the composite with enhanced energy harvesting capability and higher rate of capacitor charging.

SUMMARY OF THE INVENTION

Accordingly, present invention provides a composite comprising
  a. 90-99.9 weight % fluorinated polymers or their copolymers and;
  b. 0.1 to 10 weight % halogenated cellulosic materials, wherein polymer is poly(vinylidene fluoride) and copolymer is Poly(vinylidene fluoride-co-hexafluoropropylene), and said polymer or copolymer comprise 80-99% β phase of said poly(vinylidene fluoride) or Poly(vinylidene fluoride-co-hexafluoropropylene).

In an embodiment of the present invention, said halogen used in halogenated cellulosic materials is selected from the group consisting of fluorine, chlorine, bromine or iodine.

In another embodiment of the present invention, said cellulosic material is selected from the group consisting of micro-fibres, nano fibres, whiskers or crystals and said cellulosic material is in the range of 0.1 to 10 weight %.

In yet another embodiment of the present invention, the β phase of said poly(vinylidene fluoride) or Poly(vinylidene fluoride-co-hexafluoropropylene) is induced by said halogenated cellulosic materials.

In yet another embodiment of the present invention, said composite generates peak to peak open circuit voltage is in the range of 5-15 V.

In yet another embodiment of the present invention, said composite charge a 4.7 µF capacitor up to 0.7V within 15 seconds.

In yet another embodiment of the present invention, dielectric constant, power density, breaking elongation, breaking strength of said composite is in the range of 12 to 32; 150-800 µW/cm$^3$, 5 to 16%, 25 to 45 MPa respectively.

In yet another embodiment, present invention provides a process for the preparation of the composite comprising the steps of:
 a. dispersing the 0.1 to 10 weight % halogenated cellulosic material in a solvent to obtain a dispersion;
 b. adding 90-99.9 weight % polymer or copolymer to the dispersion of step (a) to obtain a mixture;
 c. heating the mixture as obtained in step (b) at a temperature in the range of 50–100° C. with stirring for period in the range of 1-5 hours;
 d. precipitating the mixture of step (c) by adding methanol and drying the precipitate to obtain the composite.

In yet another embodiment, present invention provides a device comprising a composite, wherein the composite comprising
 a. 90-99.9 weight % fluorinated polymers or their copolymers and;
 b. 0.1 to 10 weight % halogenated cellulosic materials,
wherein polymer is poly(vinylidene fluoride) and copolymer is Poly(vinylidene fluoride-co-hexafluoropropylene), and said polymer or copolymer comprise 80-99% β phase of said poly(vinylidene fluoride) or Poly(vinylidene fluoride-co-hexafluoropropylene).

Abbreviation

PVDF: poly(vinylidene fluoride)
NC: Nanocellulose
CNC: Carboxylated-nanocellulose
FNC: Fluorinated nanocellulose
COMU: (1-Cyano-2-ethoxy-2-oxoethylidenaminooxy) dimethylamino-morpholino-carbenium hexafluorophosphate
PVDF/CNC: Carboxylated-nanocellulose based poly (vinylidene fluoride)
PVDF/FNC: Fluorinated nanocellulose based poly (vinylidene fluoride)
DSC: Differential scanning calorimetry
WAXD: Wide-angle X-ray scattering
ESEM-EDXS: Environmental Scanning Electron Microscope/Energy Dispersive X-ray
DI: Deionized water
NaClO: Sodium hypochlorite
DIPEA: Diisopropylethyl amine
TFEA: Trifluoroethyl amine
DMF: Dimethyl formamide
XPS: X-ray photoelectron spectroscopy
WAXS: Wide-Angle X-Ray Scattering
SAXS: Small-Angle X-Ray Scattering
P (VDF-co-HFP): Poly (vinylidene fluoride-co-hexafluoropropylene)

BRIEF DESCRIPTION OF THE DRAWINGS

FIG. 1: a) ATR-FTIR (Attenuated total reflection—Fourier transform infrared spectroscopy) spectrum of CNC and FNC, b) WAXS of CNC and FNC.

FIG. 2: TEM (Transmission electron microscopy) image of nanocellulose, a) CNC in aqueous dispersion and b) FNC in hexafluoroisopropapanol dispersion.

FIG. 3: XPS spectrum of FNC, a) survey spectrum, b) deconvoluted C is spectrum.

FIG. 4: ATR-FTIR spectrum of PVDF(poly(vinylidene fluoride))-NC composite films a) FNC and b) CNC.

FIG. 5: ATR-FTIR spectrum showing probable interactions between PVDF and FNC a) showing a broad peak of hydrogen bonded —O—H group which is absent in neat PVDF, b) shift in $\upsilon_{as}$ and $\upsilon_{as}$ of PVDF/FNC composite films, dashed lined for PVDF and shifted peaks are marked with arrows.

FIG. 6: ATR-FTIR to show effect of low FNC concentration (ranging 0.1 to 1 wt %) on PVDF polar phase enhancement FIG. 7: ATR-FTIR showing effect of micro and nano cellulose on PVDF polar phase enhancement by a) PVDF, 2 wt % FMCC and 2 wt % FNC comparison, b) composites of PVDF/FMCC with PVDF FIG. 8: ATR-FTIR spectrum to show effect of FNC on P (VDF-co-HFP)

FIG. 9: WAXS analysis of PVDF/NC composite films, a) PVDF/FNC and b) PVDF/CNC.

FIG. 10: β-fraction of PVDF and PVDF/FNC composite films.

FIG. 11: Dielectric permittivity as a function of frequency for neat PVDF and PVDF/FNC composites.

FIG. 12: Polarization curve for PVDF/FNC composite films.

FIG. 13: Voltage output of PVDF and PVDF/FNC composite films.

FIG. 14: Power density of PVDF and PVDF/FNC composite films.

FIG. 15: a) Stress vs strain curve of PVDF/FNC films, b) Storage modulus as a function of temperature for PVDF and its nanocomposites.

FIG. 16: a) Capacitor charging curve for PVDF and 5 wt % PVDF/FNC, b) bridge rectifier circuit.

FIG. 17 represents the process for manufacturing film of the composites.

DETAILED DESCRIPTION OF THE INVENTION

Present invention provides organic flexible ferroelectric polymer nanocomposites.

The present invention provides a composite of fluorinated polymers and/or their copolymers with halogenated cellulosic materials with enhanced dielectric and ferroelectric properties. The composite comprises 80-99% β phase of Poly(vinylidene fluoride) (PVDF).

The halogen is selected from chlorine, bromine, iodine or fluorine, more preferably fluorine. The cellulosic material is selected from fibers, whiskeres or crystals wherein the least dimensions of fibers, whiskers or crystals are in 5 microns to 5 nanometer range.

The fluorinated polymer is Poly(vinylidene fluoride) (PVDF) and the fluorinated copolymer is Poly(vinylidene-co-hexafluoropropylene) P(VDF-co-HFP).

The halogenated cellulosic material is in the range of 0.1 to 10 wt %.

Dielectric constant of the composite is in the range of 12 to 32.

Power density of the composites is in the range of 150-800 µW/cm$^3$.

The fluorinated polymers with halogenated cellulosic materials is selected from Poly(vinylidene fluoride)-Cellulose nanocrystals (PVDF/CNC), PVDF-fluorinated microcrystalline cellulose (PVDF-FMCC) or Poly(vinylidene fluoride)-fluorinated nanocellulose (PVDF-FNC).

The fluorinated copolymer with fluorinated nanocellulose (FNC)

Breaking elongation of the composites is in the range of 5 to 16% and breaking strength is in the range of 25 to 45 MPa.

Storage modulus of the composites is in the range of 0.4 to 1.8 GPa over the temperature range of 30° C. to 150° C.

The present invention provides a process for manufacturing film of the composites wherein the film shows enhancement of conversion of α phase to β phase of the fluorinated polymer and its copolymers comprising the steps of:
a) subjecting the cellulosic material to acid hydrolysis to obtain suspension of nanocellulose (NC) crystals in water;
b) subjecting the suspension of step (a) to carboxylation via 2,2,6,6 tetramethyl-1-piperidinyloxy (TEMPO)-mediated oxidation to obtain CNC;
c) subjecting the CNC of step (b) to COMU mediated coupling with trifluoroethyl amine to obtain fluorinated NC;
d) preparing solution of PVDF/FNC of step (c) and PVDF/CNC of step (b) in a solvent followed by precipitation in alcohol preferably methanol and drying to obtain the respective composites and
e) melt pressing the composites of step (d) at the temperature range of 180-190° C. to obtain thin films with desired mechanical and ferroelectric properties.

The process for manufacturing film of the composites wherein the film shows enhancement of conversion of α phase to β phase of the fluorinated polymer and their copolymer comprising the steps of:
a) preparation of lumpy pulp by blending Whatman No.-1 filter paper with water to form lumpy pulp; adding acid to the lumpy pulp at the temperature ranging from 0° C. to −5° C. followed by heating at the temperature ranging from 80° C. to 90° C. for the time period ranging from 3 to 4 hours to form nanocellulose crystals (NC);
b) stirring the mixture of microcrystalline cellulose (MCC) or nanocellulose (NC) crystals, TEMPO, sodium halide at the temperature ranging from 25° C. to 30° C. for 5 to 15 minutes; adding sodium hypochlorite, adjusting the pH of the reaction mixture to 10-11 followed by stirring the reaction mixture at the temperature ranging from 25° C. to 30° C. for the time period ranging from 4 to 5 hours to afford carboxylated microcrystalline cellulose (CMCC) or carboxylated-nanocellulose (CNC);
c) sonicating the solution of carboxylated microcrystalline cellulose or carboxylated-nanocellulose in suitable solvent for the time period ranging from 30 min to 60 min; adding base, coupling agent, fluorine source compound to the reaction mixture at the temperature ranging from 0° C. to 5° C. followed by stirring the reaction mixture at the temperature ranging from 25° C. to 30° C. for the time period ranging from 4 to 5 hours to afford fluorinated microcrystalline cellulose (FMCC) or fluorinated nanocellulose (FNC);
d) sonicating the solution of carboxylated-nanocellulose (CNC) in suitable solvent, fluorinated microcrystalline cellulose (FMCC) in suitable solvent and fluorinated nanocellulose (FNC) in suitable solvent separately; adding PVDF in each solution followed by heating the reaction mixture at the temp ranging from 70° C. to 80° C. for the time period ranging from 3 to 4 hours to afford CNC based PVDF or FNC based PVDF;
e) sonicating the solution of fluorinated nanocellulose (FNC) in suitable solvent separately; adding P(VDF-co-HFP) to the solution followed by heating the reaction mixture at the temp ranging from 70° C. to 80° C. for the time period ranging from 3 to 4 hours to afford FMCC based P(VDF-co-HFP);
f) precipitating the solution of CNC based PVDF and FNC based PVDF of step (d) in alcohol followed by drying the precipitate of both solutions; keeping both dried precipitates between polytetrafluoroethylene sheets and undergoes melt pressing at the temperature ranging from 180° C. to 190° C. for 60 to 120 seconds without pressure and 120 to 130 seconds under 10-11 MPa pressure to afford PVDF and composite films and
g) precipitating the solution of FNC based P(VDF-co-HFP) of step (e) in alcohol followed by drying the precipitate of both solutions; keeping both dried precipitates between polytetrafluoroethylene sheets and undergoes melt pressing at the temperature ranging from 145° C. to 155° C. for 60 to 120 seconds without pressure and 120 to 130 seconds under 10-11 MPa pressure to afford P(VDF-co-HFP) and composite films.

The acid used in step (a) is selected from the group consisting of hydrochloric acid, sulfuric acid or nitric acid.

The sodium halide of step (b) is sodium bromide (NaBr).

Step (b) can be replaced with heating the NC with oxalic acid, maleic acid, succinic acid or any organic diacid.

The solvent of step (c) or (d) is selected from dimethylformamide (DMF) or dimethylsulfoxide (DMSO).

The base of step (c) is selected from the group consisting of diisopropylethyl amine (DIPEA), triethylamine or 4-(N, N-dimethylamino)pyridine.

The coupling agent of step (c) is selected from the group consisting of (1-Cyano-2-ethoxy-2-oxoethylidenaminooxy) dimethylamino-morpholino-carbenium hexafluorophosphate (COMU), O-(Benzotriazol-1-yl)-N,N,N',N'-tetramethyluronium hexafluorophosphate (HBTU) or O-(Benzotriazol-1-yl)-N,N,N',N'-tetramethyluronium tetrafluoroborate (TBTU). In still yet another preferred embodiment, the alcohol of step (e) is selected from methanol, ethanol or isopropanol.

2-5 wt % FNCs in PVDF is found to yield 95-99% conversion of non-polar α-phase into polar β-phase.

CNC is prepared by TEMPO-mediated oxidation of filter paper-derived cellulose pulp which is subsequently functionalized with trifluoroethyl amine.

The PVDF/FNC nanocomposites showed enhanced mechanical and thermomechanical properties still retaining a strain at break of 10-15% shows the feasibility of using this new class of materials as flexible low density piezoelectric energy harvesters for portable electronic devices, wireless sensors, and implantable biomedical devices.

Above process is shown in FIG. 17.

The PVDF films can be used in ferroelectric devices.

The PVDF/FNC nanocomposite films exhibited significantly high saturation polarization (~6 µC/cm$^2$) and also about 2-3 fold increase in voltage output in comparison to neat PVDF under stress. Such increase in ferroelectric β-phase content and energy generation properties of PVDF at low loading of an organic natural biopolymer is unprecedented and could be potentially used to create low density, flexible devices for energy harvesting applications at large strain conditions.

The present invention provides a device comprising the composite with enhanced dielectric and ferroelectric properties.

The device shows enhanced energy harvesting capability and higher rate of capacitor charging.

The device comprises silver foil electrodes are applied on both sides of the PVDF/FNC film. The films are then poled under an electric field of 70 MV/m for 5 minutes, cut into 3 cm×1 cm strips and encapsulated in polydimethyl siloxane with lead wires attached to the device by soldering. Energy generation measurements are carried out using a dynamic beam bending arrangement with stainless steel cantilever beam. The sensor is bonded 30 mm from the free end of a cantilevered stainless steel beam of dimensions 100×16×0.6 mm, and connected such that it can give a pure bending movement to the beam. An actuation force is applied at approximately 40 mm from the free end of the beam so that beam can be bent up to 60 mm downward at free end and freely oscillate. The force applied is approximately 3.5 N.

The output response of the piezoelectric sensor is measured using Tektronix make Mixed Signal Oscilloscope (Model no. MSO2024 16CH MSO) having maximum sampling rate of 1 GS/s and frequency range up to 200 MHz.

FIG. 1a shows FTIR spectroscopy on unmodified cellulose nanocrystals (CNC) and modified cellulose nanocrystals (FNC) reveals certain characteristic peaks. The 1720 $cm^{-1}$ associated with carboxylic acid is suppressed in FNCs and new peaks related to N—H bending appear at 1540 $cm^{-1}$. WAXD analysis (FIG. 1b) of CNC and FNC reveals all characteristic crystalline peaks of cellulose suggesting that the surface modification did not alter the crystalline morphology of FNCs.

FIG. 2 shows the TEM images of CNCs and FNCs drop casted from an aqueous dispersion. CNCs have a diameter ranging from 5-20 nm and length 200-300 nm and are well dispersed. Strong agglomeration could be observed in FNCs drop casted from aqueous dispersion due to the presence of fluorine groups.

FIG. 3 shows XPS spectra of FNC which is obtained by surface scanning of FNC from 0-1000 eV. Survey spectrum (FIG. 3a) clearly shows the presence of F atom along with C, O, and N. This confirms the reaction between carboxylic acid and trifluoroethyalmine. Obtained O/C ratio is ~0.85 for cellulose. C is spectra is deconvoluted using XPS Peak software and the peaks are assigned setting peak center at 285.0 eV for C—C bond. Wherever two peaks are too close to resolve i.e. C—C (285.0 eV) and C—N (285.2 eV) combined into one peak. The deconvoluted spectra has five major regions; C1 due —C—C (285.0 eV) and —C—N (285.2 eV); C2 due to —C—O (286.6-286.8 eV) and —CH$_2$—CF$_3$ (285.7-286.9 eV); C3 due to —C=O (288.2 eV) and —O—C—O (288.3 eV); C4 due to O—C=O (289.3-289.5 eV)/O—C=O (289.3-289.5 eV). A peak can be observed at 293 eV which is a signature peak of —CF$_3$ group (FIG. 3b).

FIG. 4 shows the influence of FNCs on the ferroelectric crystal transformation of PVDF in ATR-FTIR analysis. In the wavenumber range of 600 $cm^{-1}$ to 1000 $cm^{-1}$ peaks at 615, 766, 795, 854 and 976 corresponds to α-phase of PVDF, β-phase appears at 840 $cm^{-1}$ and γ-phase of PVDF also appears at 776, 812, 835 and 882 $cm^{-1}$. As could be seen in FIG. 4, pure PVDF crystallized primarily in the α-phase. Incorporation of FNCs as low as 2 wt % in PVDF led to a drastic reduction in the intensity of α-peaks at 765 and 795 $cm^{-1}$ with a concomitant increase in the intensity of β-phase peak at 840 $cm^{-1}$. Increasing the FNC content to 5 wt % almost suppressed the α-peaks and led to a predominant β peak at 840 $cm^{-1}$ (FIG. 4a). CNCs without modification with trifluoroethyl amine showed no such drastic transition of crystal phases in PVDF. CNCs with their strong hydrophilic —OH groups are difficult to disperse in a low surface energy fluorinated polymer such as PVDF. This leads to non-favorable interactions between PVDF and CNCs and hence has negligible influence on the phase behavior of PVDF (FIG. 4b). Trifluoromethyl groups attached to the surface of crystalline NCs promote favorable interactions between PVDF chains and surface of NC and lead to strong β-phase crystallization in PVDF.

FIG. 5 shows the probe into possible interaction between PVDF and FNC via ATR-FTIR. Strong hydrogen bonding interactions between nanocellulose and PVDF backbone probably leads to preferential ordering of PVDF chains at the interface, nucleating all-trans β-phase in PVDF. The broad peak appearing between 3100-3500 $cm^{-1}$ (FIG. 5a) in PVDF/FNC nanocomposites and not in PVDF supports this claim. Further the strong shift in vibrational symmetric and asymmetric stretching frequencies of —CH$_2$ group of PVDF from high frequency region (3030 and 2980 $cm^{-1}$) to lower frequency region (FIG. 5b) serves to corroborate the presence of interfacial interactions between PVDF and FNC.

FIG. 6 shows ATR-FTIR spectrum of PVDF/FNC where the FNC concentration is <2 wt %. The results suggest that there is no significant influence on enhancement of polar phase of PVDF between 0.1 to 1 wt % FNC. This lead to confirm the equilibrium interactions are required between PVDF and FNC to enhance the polar crystalline phase of PVDF. These favorable interactions are obtained with incorporation of 2-5 wt % of FNC into PVDF.

FIG. 7 shows the ATR-FTIR comparison spectra of FMCC and FNC with PVDF. In case of FNC with 2 wt % incorporation the characteristic β-phase of PVDF became predominate while instead with 2 wt % FMCC there is no significant change (FIG. 7a). Further increasing the concentration to 10 wt % β-phase peak started to appear (FIG. 7b) but all α-phase peaks are still present significantly. This is due to higher surface area of fluorinated nanocellulose compare to fluorinated microcrystalline cellulose which hinders the favorable interactions between FMCC and PVDF.

FIG. 8 shows the ATR-FTIR spectra of P (VDF-co-HFP)/FNC films where significant influence in enhancement of β-phase observed at FNC concentration as low as 0.5 wt %. At 2 wt % FNC incorporation α-phase almost disappeared and β-phase peak intensity increased. Further increase in the FNC content lead to reappearance of α-phase peak due to perturbation of favorable interactions between P (VDF-co-HFP) and FNC. Compare to PVDF with the P(VDF-co-HFP) maximum favorable interaction are observed at 2 wt % FNC. This can be attributed to the hexafluoropropylene present in the P (VDF-co-HFP), which inherently provide favorable interaction to crystallize in polar β-phase.

FIG. 9 shows the Wide Angle X-ray Scattering (WAXS) analysis of PVDF/FNC films also corroborates the observations from FTIR analysis. The peaks corresponding to α-phase of PVDF appear at 2θ=17.66°, 18.3°, 19.9°, and 26.6°. The γ-phase of PVDF appears at 2θ=18.5° which sometimes overlap with the 18.3° peak of the α-phase, and at 19.2°. An intense peak near 2θ=20.04° and a weak signal at 26.8° also relates to the γ-phase with (110) and (022) crystal plane respectively. The most polar β-phase appears at 2θ=20.26° which belongs to crystal plane (110) and (200). Neat PVDF revealed all four α-peaks (FIG. 9a), which either diminished or shifted to β- or γ-phase peaks in the presence of FNC. α-peaks near 2θ=17.66° and 26.6° disappeared almost completely in 2, 5 and 10 wt % PVDF/FNC composites.

The α-phase peak near 2θ=18.3° shifted to 2θ=18.5° which now corresponds to γ-phase of PVDF. The intense α-phase peak near 2θ=19.9° completely shifted to β-phase peak near 2θ=20.26°. A weak hump at 2θ=22.6° can be seen in 5 and 10 wt % PVDF/FNC which belongs to cellulosic crystals. In 2 wt % PVDF/FNC composite due to low FNC concentration this hump could not be observed. As concluded from FTIR analysis, the PVDF/CNC nanocomposites where the cellulose surface is not modified doesn't show significant suppression or transition of α-peaks in WAXS (FIG. 9b). Also there is no peak near 2θ=20.26°, which relates to β-phase of PVDF.

FIG. 10 shows the β-fraction calculation of PVDF and PVDF/FNC composite films. For neat PVDF β-fraction is as low as 5% (FIG. 10), while addition of mere 2 wt % FNC ended up with 95% β-fraction in PVDF/FNC films. Further with increased addition of FNC β-fraction maximized at 5 wt % FNC where there is >99% crystalline phase is β-phase. With 10 wt % FNC β-fraction again decreased due to reappearance of some of the α-phase peaks.

FIG. 11 shows the dielectric properties of PVDF and PVDF/FNC films. PVDF/FNC films with nanocellulose loading as low as 2 wt % showed a dielectric permittivity around 26 to 32, which is a 100% increase over the values of neat PVDF (13-15). In general, the dielectric permittivity is observed to decrease with the increase in frequency and at 1 kHZ, the dielectric permittivity of PVDF/FNC with 2 wt % nanocellulose is about 30, almost twice as that of neat PVDF at similar frequency.

FIG. 12 shows the most characteristic experimental manifestation of ferroelectricity in PVDF and PVDF/FNC nanocomposites is the hysteresis behavior of polarization as a function of applied field (FIG. 12). It is observed that PVDF/FNC composites inherit the ferroelectric nature as that of pure PVDF, even at volume fraction of 10 wt % FNC. The polarization value of the nanocomposites increased significantly in comparison with the pure PVDF and increased with increase of FNC under the same electric field due to the volume of interface region. The addition of FNC enhances the torsional and rotational motion of dipoles and domain switching due to the increase in crystallinity and the beta phase of the PVDF crystals. The saturation polarization value increased from 4.5 to 6 $\mu C/cm^2$, indicating the enhancement in ferroelectric behavior of PVDF embedded with FNC due to the enhancement of crystallinity and improved interface compatibility. The maximum saturation polarization reached to 6 $\mu C/cm^2$, for the PVDF/FNC nanocomposites, which is higher compared to values reported in earlier literature.

FIG. 13 shows the voltage output of PVDF and PVDF/FNC nanocomposites. Potential difference between the top and bottom electrodes of the devices is measured directly using oscilloscope. A continuous voltage signal is observed in all cases indicating an oscillation of the devices. Neat PVDF generated a peak to peak voltage (open circuit voltage (Voc)) of about 5 V. PVDF/FNC nanocomposites showed significantly higher peak to peak voltage than neat PVDF with the 5 wt % PVDF/FNC nanocomposite generating the maximum peak to peak voltage of about 15 V, roughly three times that of neat PVDF. 5 wt % PVDF/FNC nanocomposite showed the highest β-phase content among all the samples. 10 wt % PVDF/FNC nanocomposite showed a peak to peak voltage of about 9 V which is lower than that of 5 wt % PVDF/FNC nanocomposites but still higher than neat PVDF. This is a clear evidence of nanocellulose reinforcing the ferroelectric crystal phase and properties of PVDF.

FIG. 14 shows the power density output of devices made from poled PVDF/FNC films. Incorporation of only 2 wt % FNC increased the power density from 154 $\mu W/cm^3$ of neat PVDF to about 250 $\mu W/cm^3$. Further it is increased to 804 $\mu W/cm3$ with 5 wt % PVDF/FNC composite (FIG. 14), which is approximately 400% increase over that of neat PVDF. The power density value reported with 5 wt % PVDF/FNC in this study is much higher than previous reported value with 50 wt % PVDF/ZnO mesoporous films (160 $\mu W/cm^3$ at 60 Hz), porous PVDF (170 $\mu W/cm^3$) and order of magnitude higher than a recent report with 1 wt % PVDF/AlO-rGO (27.97 $\mu W/cm^3$). Using cheap and abundant materials like cellulose, these results are unprecedented and show the potential application in large area and flexible ferroelectric devices formation.

FIG. 15 shows a) Stress vs strain curve of PVDF/FNC films, b) Storage modulus as a function of temperature for PVDF and its nanocomposites. Addition of FNC also enhanced the mechanical and thermomechanical properties of PVDF. PVDF/FNC nanocomposites exhibited a consistently higher storage modulus than neat PVDF over the temperature range of 10-150° C. (FIG. 15a). The enhanced thermal stability and storage modulus at higher temperatures can be attributed to reinforcement effect of FNC and favorable interactions between PVDF chains and FNC. FIG. 15b shows the ultimate tensile properties of PVDF and PVDF/FNC nanocomposites. Addition of 2 wt % and 5 wt % FNC slightly increased the breaking strength of PVDF while with 10 wt % FNC content, the breaking strength is comparable to neat PVDF. The PVDF/FNC nanocomposites displayed a lower strain at break than neat PVDF as typically observed for composites with rigid reinforcing fillers. 2 and 5 wt % PVDF/FNC nanocomposites still have a strain at break of about 10-15% which is two orders of magnitude higher than some of the well-known inorganic piezoelectric materials such as lead zirconate titanate or barium titanate.

FIG. 16 shows a) capacitor charging performance of devices made with PVDF and 5 wt % PVDF/FNC. The capacitor charging experiment is done with the help of bridge rectifier (FIG. 16 b) circuit, which converts alternate current into direct current. The rate of capacitor charging is much faster in 5 wt % PVDF/FNC compare to PVDF and the accumulated voltage is 3.8 fold higher in 5 wt % PVDF/FNC within 15 seconds.

Composites of polymers or their copolymers and halogenated cellulosic materials have 80-99% β phase, which has been induced by the halogenated cellulosic material. The alternatives to the halogenated cellulosic material used in prior arts are inorganic materials, which adversely affect the mechanical properties desired in the composite, particularly elongation. This problem existing in the art has been addressed by the inventors by providing a solution in the form of halogenated cellulosic materials to induce the β phase formation in the polymer or copolymers and yet retaining the mechanical properties of the composite. Further the composite may be sued in various forms such as films in devices for their ferro and piezo electrical properties.

EXAMPLES

Following examples are given by way of illustration therefore should not be construed to limit the scope of the invention.

Example 1: Preparation of Carboxylated-Nanocellulose (CNC)

Cellulose suspension was prepared from 5 g of Whatman No.-1 filter paper combined with 250 mL of Deionized water and blended at high speed until a lumpy pulp was formed which was homogenized to form a fine homogenous pulp. Concentrated HCl (11.65N) was dropwise added to cellulose pulp which was kept at 0° C. The final concentration of HCl in the solution was kept 3N. Further suspension was heated to 80° C. After 3 h reaction mixture was cooled down to room temperature (25° C.) and filtered and washed with DI water until obtained supernatant was a neutral. The redispersed cellulose suspension of known concentration was mixed with 0.5 g of 2,2,6,6 tetramethyl-1-piperidinyloxy (TEMPO) and 5 g of NaBr and stirred for 5 minutes at room temperature. In this reaction 25 wt % NaClO (based on dry weight of cellulose in the suspension) was added. The pH of the solution was adjusted to 10-11 by 3N NaOH and the mixture was stirred for 4 h at room temperature. After 4 hours, 30 g of NaCl was added to the reaction mixture and the cellulose suspension was precipitated. The product was filtered through a pore fritted glass filter (medium) and further washed with 0.5-1 M NaCl by redispersion and centrifugation. This washing procedure was repeated three to four times to remove any remaining NaClO. The carboxylates were converted into free acid form by two more washing cycles with 0.1N HCl. Finally, the product was dialyzed against deionized water for 3 days and the cellulose nanofibers in water became a colloidal suspension.

Example 2: Preparation of Carboxylated Microcrystalline Cellulose (CMCC)

Commercially available microcrystalline cellulose suspension of known concentration was mixed with 0.5 g of 2,2,6,6 tetramethyl-1-piperidinyloxy (TEMPO) and 5 g of NaBr and stirred for 5 minutes at room temperature. In this reaction 25 wt % NaClO (based on dry weight of cellulose in the suspension) was added. The pH of the solution was adjusted to 10-11 by 3N NaOH and the mixture was stirred for 4 h at room temperature. After 4 hours, 30 g of NaCl was added to the reaction mixture and the cellulose suspension was precipitated. The product was filtered through a pore fritted glass filter (medium) and further washed with 0.5-1 M NaCl by redispersion and centrifugation. This washing procedure was repeated three to four times to remove any remaining NaClO. The carboxylates were converted into free acid form by two more washing cycles with 0.1N HCl. Finally, the product was dialyzed against deionized water for 3 days.

Example 3: Preparation of Fluorinated Nanocellulose (FNC)

0.7 mmol (1 g) of CNC (carboxyl group 700 mmol/kg) was dispersed in 25 mL of DMF by 30 min sonication followed by stirring. Further 1.4 mmol (244 µL) of diisopropylethyl amine (DIPEA) was added at 0° C. Subsequently, 0.7 mmol (~300 mg) COMU was added followed by addition of 1.4 mmol (110 µL) trifluoroethyl amine (TFEA) which turned the solution yellow in color. After 1 h, ice bath was removed to bring the reaction to room temperature and further stirred for 4 h. The reaction mixture was centrifuged at 5000 rpm and washed with DI water. Washing procedure was repeated until colorless supernatant was obtained. Precipitate was redispersed in DI water and freeze dried for further use.

Example 4: Preparation of Fluorinated Microcrystalline Cellulose (FMCC)

0.7 mmol (1 g) of CMCC (carboxyl group 700 mmol/kg) was dispersed in 25 mL of DMF by 30 min sonication followed by stirring. Further 1.4 mmol (244 µL) of diisopropylethyl amine (DIPEA) was added at 0° C. Subsequently, 0.7 mmol (~300 mg) COMU was added followed by addition of 1.4 mmol (110 µL) trifluoroethyl amine (TFEA) which turned the solution yellow in color. After 1 h, ice bath was removed to bring the reaction to room temperature and further stirred for 4 h. The reaction mixture was centrifuged at 5000 rpm and washed with DI water. Washing procedure was repeated until colorless supernatant was obtained. Precipitate was redispersed in DI water and freeze dried for further use.

Example 5: Preparation of PVDF Composite Films

A. CNC Based PVDF:
6, 15 and 30 mg of CNC dispersed in 1 mL of DMF by 20 minutes of sonication followed by stirring. 294, 285 and 270 mg of PVDF was added to these well dispersed CNC solutions respectively to make 2, 5 and 10 wt % CNC/PVDF solutions. Then the solutions were heated at 70° C. with continuous vigorous stirring for 3 h. PVDF solution was also prepared as a control.
B. FNC Based PVDF:
6, 15 and 30 mg of FNC dispersed in 1 mL of DMF by 20 minutes of sonication followed by stirring. 294, 285 and 270 mg of PVDF was added to these well dispersed FNC solutions respectively to make 2, 5 and 10 wt % FNC/PVDF solutions. Then the solutions were heated at 70° C. with continuous vigorous stirring for 3 h. PVDF solution was also prepared as a control.
C. FMCC Based PVDF
6, 15 and 30 mg of FMCC dispersed in 1 mL of DMF by 20 minutes of sonication followed by stirring. 294, 285 and 270 mg of PVDF was added to these well dispersed FMCC solutions respectively to make 2, 5 and 10 wt % PVDF/FMCC solutions. Then the solutions were heated at 70° C. with continuous vigorous stirring for 3 h. PVDF solution was also prepared as a control.
The prepared solutions in example (A), (B) and (C) were precipitated in methanol by dropwise addition. The precipitate was collected and dried in air at room temperature overnight (12 hr) and 50° C. under vacuum for 12 hrs.
Well dried precipitates were kept between polytetrafluoroethylene sheets and melt pressed at 180° C. for 60 seconds without pressure and 120 seconds under 10-11 MPa Pa pressure. The prepared neat and composite films were used for further characterization.

Example 6: Preparation of Poly(VDF-co-HFP) Copolymer Composite Films 4, 10 and 20 mg of FNC dispersed in 1 mL of DMF by 20 minutes of sonication followed by stirring. 296, 290 and 280 mg of Poly(VDF-co-HFP) was added to these well dispersed FNC solutions respectively to make 2, 5 and 10 wt % Poly(VDF-co-HFP)/FNC solutions. Then the solutions were heated at 70° C. with continuous vigorous stirring for 3 h. Poly(VDF-co-HFP) solution was also prepared as a control.
The prepared solutions were precipitated in methanol by dropwise addition. The precipitate was collected and dried in air at room temperature overnight and 50° C. under vacuum for 12 hrs.
Well dried precipitates were kept between Polytetrafluoroethylene sheets and melt pressed at 150° C. for 60 seconds without pressure and 120 seconds under 10-11 MPa Pa pressure. The prepared neat and composite films were used for further characterization.

Example 7: Preparation of TEM Sample 0.01 mg/mL CNC and FNC dispersions in DI water were prepared by sonication for 30 mins and immediately drop casted on carbon coated copper grid. The grid was dried in air at room temperature for 48 h before analysis. Images were obtained using transmission electron microscope (Technai T-20) at an accelerating voltage of 200 kV.

Example 8: Characterization of Crystallinity and Phase Transformation (A) ATR-FTIR:

CNC, FNC, CNC-PVDF and FNC-PVDF composites were characterized by Perkin Elmer's FTIR instrument (Spectrum GX Q5000IR) using ATR mode. Ten scans were performed using 4 $cm^{-1}$ resolution.

(B) WAXS:

Room temperature Wide Angle X-ray Scattering (WAXS) were performed using a Rigaku MicroMax-007 HF using a rotating anode copper X-ray source with wavelength $\lambda(K_\alpha)$ =1.54 Å. The instrument was operated at 40 kV and 30 mA. 2-D scattering patterns were converted to 1-D profiles after background subtraction using Rigaku 2DP software and scattered intensity was plotted against 2θ in the range of 2-40θ.

(C) SAXS:

Small Angle X ray scattering (SAXS) was performed using the Rigaku Nano-Viewer equipped with a microfocus source (Cu $K_\alpha$ radiation, $\lambda$=0.154 nm, 1.2 KW rotating anode generator) and a two dimensional detector (HyPix-3000 with a radiation hardened semiconductor sensor).

Example 9: Polling of Films

The PVDF/FNC films and PVDF film was sandwiched between silver foil electrodes and the films were then poled under an electric field of 70 MVm 1 for 5 minutes.

Example 10: Polarization Curve of PVDF/FNC Films

The ferroelectric hysteresis loops were measured by using a Sawyer-Tower circuit. Polarization measurements were recorded using a hysteresis loop analyzer (aix ACCT TF 2000 analyser). Time dependent leakage current was measured dynamically during the hysteresis loop measurements. It was recorded for various applied voltage steps using the TF analyzer. The gap observed at the start and end points of the P-E hysteresis is due to the delay period between the (i) preset loop and the start of the measurement loop, (ii) space charge formed from the lattice distortion, and (iii) energy traps at the electrode interfaces.

Example 11: Fabrication of Device and Energy Harvesting Measurements

Polled films cut into 3 cm×1 cm strips and encapsulated in polydimethyl siloxane with lead wires attached to the device by soldering. Energy generation measurements were carried out using a dynamic beam bending arrangement with stainless steel cantilever beam. The sensor was bonded 30 mm from the free end of a cantilevered stainless steel beam of dimensions 100×16×0.6 mm, and connected such that it can give a pure bending movement to the beam. An actuation force was applied at approximately 40 mm from the free end of the beam so that beam can be bend up to 60 mm downward at free end and freely oscillate. The force applied was approximately 3.5 N.

Example 12: Power Density Measurements

The voltage measurements with a load results in $V_{load}$ and using Ohm's law (V=IR) the load current $I_{load}$ was calculated for PVDF and PVDF/FNC composites. The product of $V_{oc}-V_{load}$ and $I_{load}$ per volume yields power density.

The output response of the piezoelectric sensor was measured using Tektronix make Mixed Signal Oscilloscope (Model no. MSO2024 16CH MSO) having maximum sampling rate of 1 GS/s and frequency range up to 200 MHz.

Incorporation of only 2 wt % FNC increased the power density from 154 $\mu W/cm^3$ of neat PVDF to about 250 μW/cm3. Further it is increased to 804 μW/cm3 with 5 wt % PVDF/FNC composite (FIG. 14), which is approximately 400% increase over that of neat PVDF. The power density value reported with 5 wt % PVDF/FNC in current invention is much higher than previous reported value with 50 wt % PVDF/ZnO mesoporous films (160 $\mu W/cm^3$ at 60 Hz), porous PVDF (170 $\mu W/cm^3$) and order of magnitude higher than a current invention with 1 wt % PVDF/AlO-rGO (27.97 $\mu W/cm^3$).

Example 13: Capacitor Charging Performance

To show the capacitor charging performance, design a bridge rectifier circuit, which coverts alternate current into direct current. The whole integrated circuit comprised of a piezo device, a bridge rectifier circuit and the multimeter. The devices were subjected to a constant impact and capacitor charging was observed with the help of multimeter. The rate of capacitor charging is much faster in 5 wt % PVDF/FNC compare to PVDF and the accumulated voltage is 3.8 fold higher in 5 wt % PVDF/FNC within 15 seconds.

Advantages of the Invention a. High electroactive β phase and dielectric permittivity values in PVDF using very low loading of organic nanofiller.
b. 3-4 fold increase in open circuit voltage of PVDF/FNC compare to PVDF.
c. 3-4 fold increase in power density values with low loading of organic nanofiller.
d. The rate of capacitor charging is 3-4 fold higher in 5 wt % PVDF/FNC.
e. PVDF composites with low density, flexibility and easier processing.
f. Composite suitable for capacitors, energy storage, sensors etc.
g. An environmentally benign and cheap cellulosic materials used as a filler.

We claim:
1. A composite comprises:
a. 90-99.9 weight % fluorinated polymers or their copolymers; and
b. 0.1-10 weight % halogenated cellulosic materials,
wherein the polymer is poly(vinylidene fluoride) and the copolymer is poly(vinylidene fluoride-co-hexafluoropropylene), and the polymer or copolymer comprises 80-99% β phase of the poly(vinylidene fluoride) or pol(vinylidene fluoride-co-hexafluoropropylene).

2. The composite as claimed in claim 1, wherein the halogenated cellulosic materials comprise a halogen selected from the group consisting of fluorine, chlorine, bromine, and iodine.

3. The composite as claimed in claim 1, wherein the halogenated cellulosic materials comprise a cellulosic material selected from the group consisting of micro-fibres, nano fibres, whiskers, and crystals.

4. The composite as claimed in claim 1, wherein the β phase of said poly(vinylidene fluoride) or poly(vinylidene fluoride-co-hexafluoropropylene) is induced by the halogenated cellulosic materials.

5. The composite as claimed in claim 1, wherein the composite generates peak to peak open circuit voltage in the range of 5-15 V.

6. The composite as claimed in claim 1, wherein the composite charges a 4.7 μF capacitor up to 0.7V within 15 seconds.

7. The composite as claimed in claim 1, wherein dielectric constant, power density, breaking elongation, breaking strength of the composite is in the range of 12-32; 150-800 μW/cm$^3$, 5-16%, and 25-45 MPa, respectively.

8. A process for the preparation of the composite as claimed in claim 1, wherein the process comprises the steps of:
   a. dispersing the 0.1-10 weight % halogenated cellulosic materials in a solvent to obtain a dispersion;
   b. adding the 90-99.9 weight % fluorinated polymers or their copolymers to the dispersion of step a. to obtain a mixture;
   c. heating the mixture as obtained in step b. at a temperature in the range of 50-100° C. with stirring for period in the range of 1-5 hours and
   d. precipitating the mixture of step c. by adding methanol and drying the precipitate to obtain the composite.

9. A device comprising a composite, wherein the composite comprises:
   a. 90-99.9 weight % fluorinated polymers or their copolymers; and
   b. 0.1-10 weight % halogenated cellulosic materials,
   wherein the polymer is poly(vinylidene fluoride) and the copolymer is poly(vinylidene fluoride-co-hexafluoropropylene), and the polymer or copolymer comprises 80-99% β phase of the poly(vinylidene fluoride) or poly(vinylidene fluoride-co-hexafluoropropylene).

* * * * *